(12) United States Patent
Bacus et al.

(10) Patent No.: US 9,984,045 B2
(45) Date of Patent: May 29, 2018

(54) DYNAMIC ADJUSTMENT OF RENDERING PARAMETERS TO OPTIMIZE READING SPEED

(71) Applicant: Amazon Technologies, Inc., Seattle, WA (US)

(72) Inventors: Michael Patrick Bacus, Seattle, WA (US); Lokesh Joshi, Mercer Island, WA (US); Joseph King, Seattle, WA (US); Stephen W. Swales, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/754,192

(22) Filed: Jun. 29, 2015

(65) Prior Publication Data

US 2016/0378720 A1  Dec. 29, 2016

(51) Int. Cl.
*G09B 19/00* (2006.01)
*G06F 17/21* (2006.01)

(52) U.S. Cl.
CPC .......... *G06F 17/214* (2013.01); *G06F 17/211* (2013.01); *G06F 17/212* (2013.01)

(58) Field of Classification Search
CPC .................................................. G06F 17/211
See application file for complete search history.

(56) References Cited

U.S. PATENT DOCUMENTS

| 5,256,067 | A | 10/1993 | Gildea et al. |
| 5,876,334 | A | 3/1999 | Levy |
| 5,957,699 | A | 9/1999 | Peterson et al. |
| 6,086,382 | A | 7/2000 | Thomas |
| 6,361,322 | B1 | 3/2002 | Linden Henry |
| 6,409,513 | B1 | 6/2002 | Kawamura et al. |
| 6,561,812 | B1 | 5/2003 | Burmester et al. |
| 6,869,287 | B1 | 3/2005 | Tadlock et al. |
| 7,114,126 | B2 | 9/2006 | Berger et al. |
| 7,286,793 | B1 | 10/2007 | Miele |
| 7,293,025 | B1 | 11/2007 | Harouche |
| 7,455,522 | B2 | 11/2008 | Polanyi et al. |
| 7,464,023 | B2 | 12/2008 | Parry et al. |
| 7,568,160 | B2 | 7/2009 | Berger et al. |
| 8,517,738 | B2 | 8/2013 | Sheehan et al. |
| 8,834,166 | B1 | 9/2014 | Ionkov et al. |
| 9,069,332 | B1 | 6/2015 | Gayles |
| 9,544,204 | B1 * | 1/2017 | Madhivanan ........... H04L 67/22 |
| 2003/0017442 | A1 | 1/2003 | Tudor et al. |
| 2003/0027122 | A1 | 2/2003 | Stansvik |
| 2003/0068603 | A1 | 4/2003 | Cupp |

(Continued)

*Primary Examiner* — Mohammed-Ibrahim Zuberi
(74) *Attorney, Agent, or Firm* — Lowenstein Sandler LLP

(57) ABSTRACT

A rendering optimizer captures content engagement feedback associated with a first interval during which electronic content is presented with a first set of rendering parameter values. The rendering optimizer adjusts at least one rendering parameter value of the first set of rendering parameter values by a step amount in a first direction to create a second set of rendering parameter values and captures content engagement feedback associated with a second interval during which the electronic content is presented with the second set of rendering parameter values. The rendering optimizer further adjusts the rendering parameter values to determine they result in an improvement in reading immersion.

20 Claims, 9 Drawing Sheets

(56) References Cited

U.S. PATENT DOCUMENTS

| | | | |
|---|---|---|---|
| 2003/0227479 A1 | 12/2003 | Mizrahi et al. | |
| 2004/0067472 A1 | 4/2004 | Polanyi et al. | |
| 2004/0110120 A1 | 6/2004 | Ho et al. | |
| 2004/0219502 A1 | 11/2004 | Bechard et al. | |
| 2006/0008781 A1 | 1/2006 | Townshend et al. | |
| 2006/0063139 A1 | 3/2006 | Carver et al. | |
| 2006/0084047 A1 | 4/2006 | Chiu et al. | |
| 2007/0218432 A1* | 9/2007 | Glass | G09B 5/04 434/156 |
| 2007/0238077 A1 | 10/2007 | Strachar | |
| 2007/0269788 A1 | 11/2007 | Flowers et al. | |
| 2008/0096171 A1 | 4/2008 | Movahhedi | |
| 2008/0108029 A1 | 5/2008 | Luke et al. | |
| 2008/0138787 A1 | 6/2008 | Weinstein | |
| 2010/0041000 A1* | 2/2010 | Glass | G09B 5/02 434/179 |
| 2012/0001923 A1 | 1/2012 | Weinzimmer et al. | |
| 2012/0231441 A1 | 9/2012 | Parthasarathy et al. | |
| 2014/0327609 A1* | 11/2014 | Leroy | G06F 3/013 345/156 |
| 2014/0331125 A1* | 11/2014 | Tigchelaar | G06F 17/211 715/249 |

* cited by examiner

DYNAMIC ADJUSTMENT OF RENDERING PARAMETERS TO OPTIMIZE READING SPEED

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
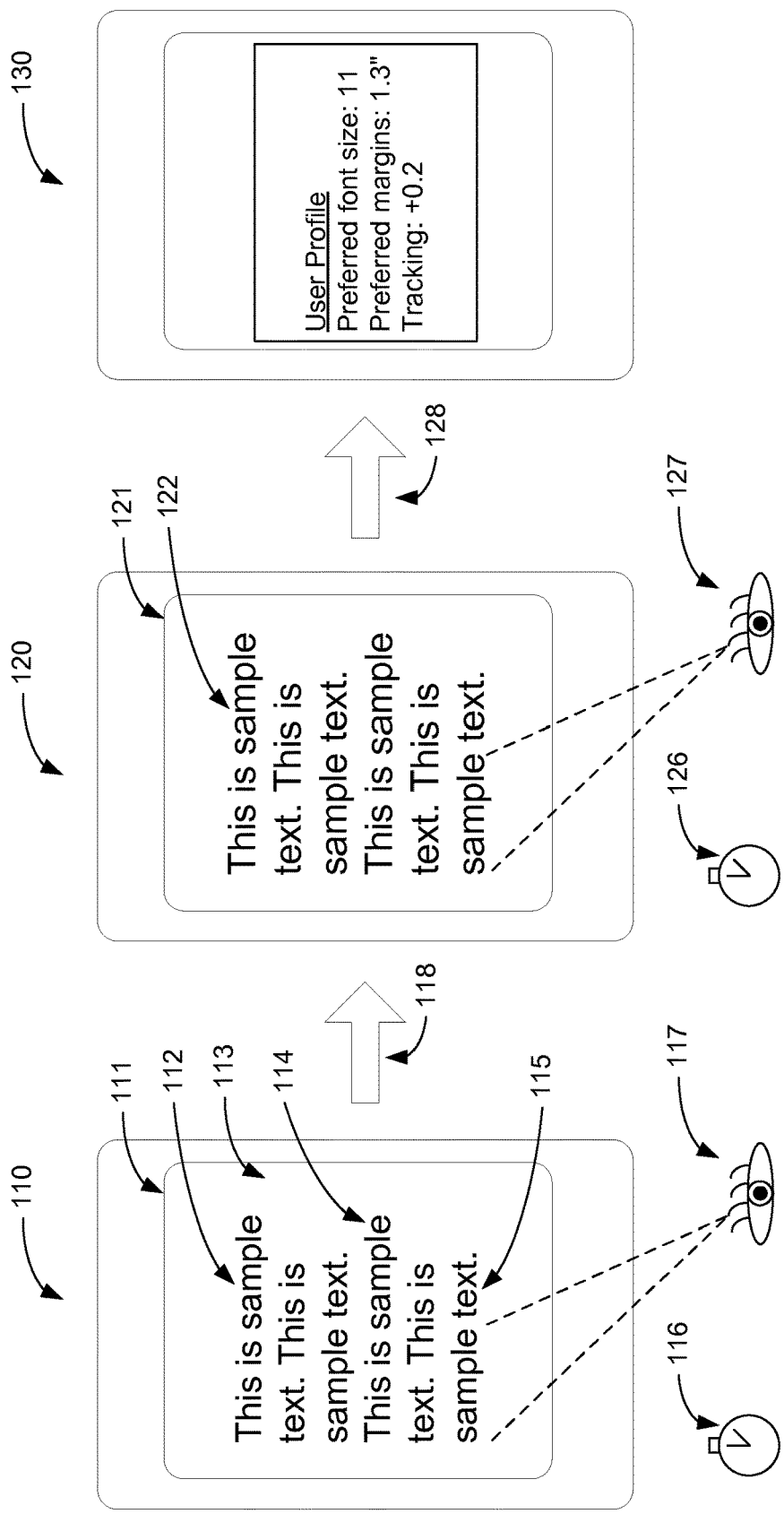
FIG. 1 is a diagram illustrating a user device utilizing rendering parameter optimization, according to an embodiment.

Embodiments are described for dynamic adjustment of rendering parameters to optimize reading speed. In certain embodiments, a reading application on a user device, such as a smartphone, tablet, eReader, etc., includes a rendering panel that allows a reader to alter rendering parameter values for display of electronic contents, such as an electronic publication on the device. In other embodiments, other types of content may include, textual content, audio content, video content, multimedia content, or other types of content. Users generally use the options in this panel to resize text or adjust other layout parameters, such as margins, line spacing, font family, etc. An adjustment to the font size generally corrects for eyesight deficiencies in order to render characters and glyphs that are easily legible. In one embodiment, the reading application further includes a rendering optimizer that implements a learning system to utilize feedback in order to improve reading performance.

In one embodiment, the learning system makes use of reading stream data to determine how long it takes a user to read a page, chapter, section, segment, or other amount of content that are presented with a given set of rendering parameter values. The reading speed calculation may take into account variances of content density associated with the current set of rendering parameter values. The rendering optimizer may randomly or pseudo-randomly alter and measure minute changes in the rendering parameters to determine the impact of changes in text density, kerning, font choice, ligatures, line spacing, margin setting, justification, hyphenation, ligatures, auto-columniation, and a variety of other characteristics on reading speed, reading immersion and overall user experience. These rendering parameter values can be altered from page to page without the reader being able to detect or recognize that changes are occurring so as not to interrupt the reading experience. Improved reading immersion may be categorized, for example, by consistently faster reading speeds, including from line to line and from page to page, increased legibility (i.e., decreased error rate), a longer reading duration or any combination of two or more of these or other factors.

In one embodiment, the learning system can feed rendering parameter values and subsequent throughput/reading performance feedback into a statistical model to predict the next set of changes. The model may be trained via a combination of user accrued information on reading performance and optionally be augmented by feedback from other readers on the same content to determine how to optimize settings for future presentation of this or other electronic publications.

In one embodiment, the rendering parameter values that improve reading immersion may vary across different types of content for the same user. For example, the combination of rendering parameter values that best improves reading immersion may be different for electronic books, social media postings, websites, comic books, etc. As a result, the learning system can capture reading performance data and optimize the combination of rendering parameter for multiple different types of content. An indication of the rendering parameter values may be stored in user profile data and accessed when certain content types are presented for display in the future. For example, in one embodiment, a particular font size may be used for display of a text book, while a different font size is used for display of an adventure novel. In another embodiment, the line spacing may be different when a news article displayed from when a blog posting is displayed. The rendering parameter values may also be device specific, such that the learning system identifies different sets of rendering parameter values for use when content is being displayed on a laptop computer, desktop computer, mobile phone, tablet, electronic reader, etc. This data may also be recorded in the user profile data for later use.

FIG. 1 is a diagram illustrating a user device utilizing rendering parameter optimization, according to an embodiment. Display 110 of the user device presents a page 111 of an electronic publication according to a first set of rendering parameter values. These rendering parameters may include font size 112, margin size 113, line length 114, character spacing 115 or other parameters. The rendering parameter values include the specific settings for each of the rendering parameters. For example, for the rendering parameter of font size 112, the value may include 10 pt, 12 pt, 14 pt, etc. For the rendering parameter of margin size 113, the value may include 1×, 1.5×, 2×, etc. In one embodiment, one or more pages of the electronic publication are presented with the first set of rendering parameter values for a first interval while content engagement feedback, such as reading performance feedback, is captured. The content engagement feedback may be indicative of the user's level of immersion in the electronic content. In one embodiment, reading performance feedback may be measured using reading speed, legibility, comprehension or some combination of these or other metrics. For example, a timer may measure the amount of time 116 it takes the user to read the text on page 111. In one embodiment, the user device may include an eye movement tracking system that can detect where on display 110 the user's eyes are focused 117. This system can determine how many times a user has to go back and re-read certain sections of the electronic publication (i.e., the error rate). This may be indicative of an increase in legibility.

At the end of the first interval 118 (e.g., after a certain period of time has passed, or a certain number of pages have been viewed), a rendering optimizer on the device, can adjust at least one rendering parameter value of the first set of rendering parameter values by a step amount to create a second set of rendering parameter values for a next page 121, as shown in display 120. For example, the font size 122 may be increased by an amount not larger than a threshold amount relative to the previous value. Thus, if the font size 112 in display 110 was 10 point, the font size 122 may be increased to 11 point in display 120. One or more pages 121 of the electronic publication are presented with the second set of rendering parameter values for a second interval 128 while reading performance feedback is again captured by a timer 126 or eye-movement tracking system 127. By adjusting the font size in such a small amount, the change may not be perceptible to the user so as not to interrupt the reading experience. In one embodiment, only one rendering parameter value may be adjusted during the second interval 128. In other embodiments, however, multiple rendering parameter values may be adjusted at a time.

Once reading performance feedback is captured for the second interval 128, the rendering optimizer may compare the feedback from the first and second intervals to determine whether an improvement in reading performance or immersion has been observed. Indications of improved reading performance and immersion may include increased reading speed, increased reading duration, decreased error rate, increased reading comprehension, etc. In one embodiment, the rendering optimizer may continue adjusting the first rendering parameter value (e.g., font size) to determine if additional improvements can be observed. In addition, the rendering optimizer may repeat the process of making adjustments and capturing reading performance feedback for other rendering parameters, such as margin size, line length, character spacing, etc. When an improvement is detected or when an optimized set of rendering parameter values is determined, the rendering optimizer may update user profile data to indicate the preferred rendering parameter values for future display of the electronic publication, as shown in display 130. In one embodiment, the update to user profile data may be done in the background without presentation of the profile on the display or other notification to the user.

Figure 2:
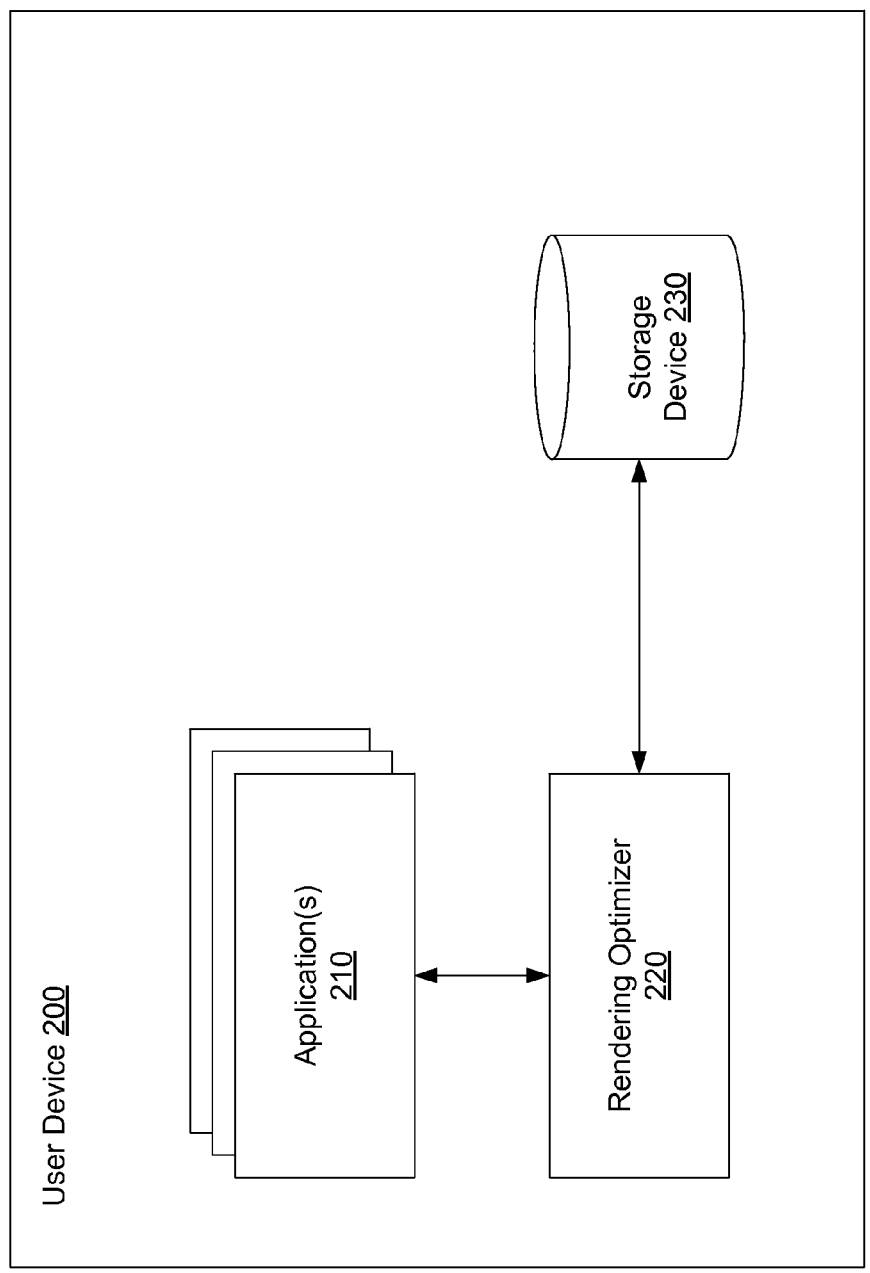
FIG. 2 is a block diagram illustrating a user device configured for rendering parameter optimization, according to an embodiment.

FIG. 2 is a block diagram illustrating a user device 200 configured for rendering parameter optimization, according to an embodiment. In one embodiment, the user device 200 includes one or more applications 210, rendering optimizer 220 and storage device 230. User device 200 may include for example, an electronic book reader (eReader), cellular telephone, smartphone, personal digital assistant (PDA), portable media player, tablet computer, electronic pad, netbook, desktop computer, notebook computer, or the like.

Applications 210 may be computer application programs that offer varying functionality. For example, one of applications 210 may be an electronic reader application that enables consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. One of applications 210 may be a web browser that enables loading and viewing of web pages from the Internet or other network. One of applications 210 may be an email or messaging program than enables the sending and receiving of electronic mail messages, short message service (SMS) messages, multimedia messaging service (MMS) messages, or other types of messages. In one embodiment, applications 210 may include any other types of entertainment, productivity, communication, social networking, or other types of applications.

In one embodiment, rendering optimizer 220 controls the presentation of an electronic publication or other information in one of applications 210 and subtly adjusts the rendering parameter values from page to page while capturing reading performance feedback. Over time, rendering optimizer 220 can determine which rendering parameters have an effect on reading performance and can determine an optimized set of rendering parameter values that result in improved reading immersion. In one embodiment, rendering optimizer 220 may be a standalone application running on user device 200. In another embodiment, rendering optimizer 220 may be part of an operating system (OS) running on user device 200. In yet another embodiment, rendering optimizer 220 may be part of electronic reader application 210 running on user device 200. In general, rendering optimizer 220 may utilize an iterative optimization approach, a statistical optimization approach or a combination of two or more of these approaches to identify the optimal rendering parameter values. In one embodiment, for example, rendering optimizer 220 may use a branch and bound iterative approach. Branch and bound is an algorithm design paradigm for discrete and combinatorial optimization problems. A branch-and-bound algorithm consists of a systematic enumeration of candidate solutions by means of state space search where the set of candidate solutions is thought of as forming a rooted tree with the full set at the root. The algorithm explores branches of this tree, which represent subsets of the solution set. Before enumerating the candidate solutions of a branch, the branch is checked against upper and lower estimated bounds on the optimal solution, and is discarded if it cannot produce a better solution than the best one found so far by the algorithm. In another embodiment, rendering optimizer 220 may use a direct Monte Carlo sampling stochastic approach. A Monte Carlo approach relies on repeated random sampling to obtain numerical results. Additional details of rendering optimizer 220, and possible optimization approaches, are provided below with respect to FIGS. 3-7.

Storage device 230 may include a main memory, such as read-only memory (ROM), flash memory, dynamic random access memory (DRAM) (such as synchronous DRAM (SDRAM), etc.), or a static memory, such as flash memory, static random access memory (SRAM), etc. In other embodiments, storage device 230 may include some other type of storage device for storing information in a form (e.g., software, processing application) readable by a machine (e.g., a computer). The storage device 230 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

Figure 3:
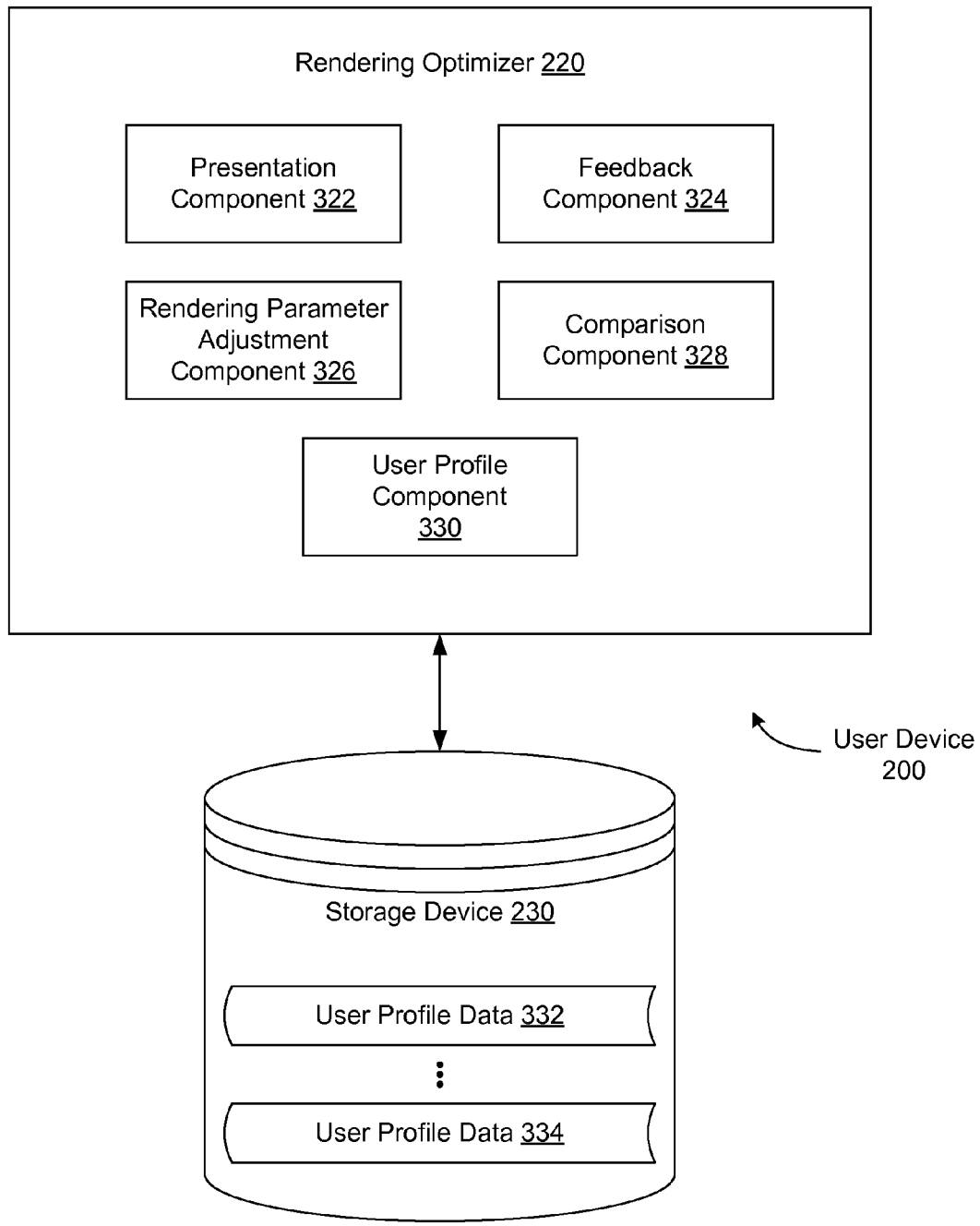
FIG. 3 is a block diagram illustrating a rendering optimizer, according to an embodiment.

FIG. 3 is a block diagram illustrating a rendering optimizer 220 that is included in user device 200, according to an embodiment. In one embodiment, rendering optimizer 220 may include presentation component 322, feedback component 324, rendering parameter adjustment component 326, comparison component 328 and user profile component 330. This arrangement of components may be a logical separation, and in other embodiments, these components can be combined together or separated in further components, according to a particular embodiment. In one embodiment, rendering optimizer 220 is connected to storage device 230 having a data store, which may be, for example, a file system, database or other data management layer resident on a data storage device such as a disk drive, RAM, ROM, flash memory, etc. The data store may include user profile data 332-334. In one embodiment, user device 200 may include both rendering optimizer 220 and storage device 230. In another embodiment, storage device 230 may be external to user device 200 and may be connected to user device 200 over a network or other connection. In other embodiments, user device 200 may include different and/or additional components which are not shown in order to simplify the description.

In one embodiment, presentation component 322 interfaces with one of applications 210, such as an electronic reader application, to control the presentation of an electronic publication or other content with a given set of rendering parameter values. In one embodiment, presentation component 322 may provide the set of rendering parameter values to the application 210 to cause the application 210 to present the electronic publication on a display of user device 200 according to the set of rendering parameter values. In one embodiment, presentation component 322 may provide values for various rendering parameters such as font size, font type, margin size, line height, line length, character spacing, kerning, background contrast, hyphenation, justification, column number, column width, tracking, sharpening, stoke weight, illumination wavelength or other rendering parameters. The illumination wavelength of the display may affect the perceived color or hue of the display. Changing the color (e.g., based on the time of day) may place less strain on the user's eyes and avoid disruption to the user's circadian rhythm. In one embodiment, presentation component 322 provides an initial set of rendering parameter values. The initial set may include default or standard values for each of the rendering parameters. The initial set of rendering parameter values may include values set or selected by the user through a rendering panel presented in a user interface on the display of the user device 200. The initial set of rendering parameter values may also be determined from user profile data 332-334 stored in storage device 230. As will be described below, one or more of the initial set of rendering parameter values may be adjusted by rendering parameter adjustment component 326 to create an updated set of rendering parameter values. Upon creation, presentation component 322 may provide the updated set of rendering parameter values to application 210 to cause the application 210 to present the electronic publication according to the updated set of rendering parameter values.

In one embodiment, feedback component 324 captures or receives reading performance feedback from the application 210 that presents the electronic publication according to the set of rendering parameters. Depending on the embodiment, the reading performance feedback may be measured in different ways. For example, feedback component 324 may capture reading speed, reading duration, an error rate, reading comprehension, user input or other types of feedback. In one embodiment, feedback component 324 determine the number of words, characters or paragraphs that are displayed on a current page in view of the current set of rendering parameters and uses a timer to determine how long the user spends reading each page. For example, feedback component 324 may start the timer when the page is first rendered and stop the timer when a "turn page" command is received. In another embodiment, feedback component 324 may measure the period of time between received "turn page" commands. Feedback component 324 may determine the user's reading speed by dividing the number of words by the value of the timer (e.g., to calculate words per minute, or some other measure of speed). For example, feedback component 324 could use some other segment size, such as lines, paragraphs, pages, etc. per unit of time. In one embodiment, the reading speed for any segment (e.g., a page, series of pages, or publication) may be weighted by the characteristics of the segment. For example, the feedback values for segments that are classified as having a higher complexity may be weighted less because it is expected that the reading times will be longer. Similarly, if a segment has non-text elements, such as images, charts, tables, etc., that the user may spend extra time reviewing, this may be accounted for by the weighting. As a result the feedback may give a more accurate representation of the reader's immersion with a given set of rendering parameter values. In another embodiment, feedback component may utilize an eye movement tracking system that can detect where the user's eyes are focused on the display (i.e., which paragraph, line, word or character they are currently reading. This system can determine how many times or how often a user stops reading or re-reads certain sections of the electronic publication. This value may be representative of an "error rate." In one embodiment, the eye movement tacking system can also measure fixation duration (i.e., the amount of time a reader fixates on a particular written element, such as a word, character or letter). The fixation duration may be one indicator of reading comprehension. In other embodiments, feedback component 324 may capture the total amount of time the user spends reading during a single session (i.e., reading duration), or may receive user input indicative of reading comprehension (e.g., in the form of answers to questions related to the content being consumed) or indicative of whether the user prefers the current set of rendering parameters (e.g., a "like" or "dislike" response). In one embodiment, feedback component 324 may store the received reading performance feedback in corresponding user profile data 332-334.

In one embodiment, rendering parameter adjustment component 326 is configured to dynamically and systematically adjust at least one rendering parameter value by a step amount to create a new set of rendering parameter values. In one embodiment, the step amount may include a value equal to the minimum increment by which the associated parameter can be adjusted on the device. In one embodiment, the step amount may include an increase or decrease to the value of a particular parameter an amount not larger than a threshold amount relative to the previous value (e.g., 1%, 5%, 10%, 25%, etc.). For example if the previous font size was 10 point, and the threshold amount is 5%, the step amount may be 0.5 point. Thus, rendering parameter adjustment component 326 may adjust the font size by no more than plus or minus 0.5 point (e.g., to 9.5 point or 10.5 point). In another embodiment, the step amount may be a fixed value without any dependence on the previous value of the rendering parameter. The step amount can vary depending on the particular rendering parameter. The step amount can also be device dependent as different devices may have different types of displays (e.g., electronic ink, liquid crystal, etc.) with different rendering characteristics. In general, the step amount may be a value that is not or is barely visually perceptible to the user. As a result, when a certain rendering parameter value is adjusted by the step amount, the change may not even be detected by the user, so as not to interrupt the reading experience. In one embodiment, rendering parameter adjustment component 326 may adjust the rendering parameters in a set order (e.g., first font size, then margin size, then character spacing, etc.). The set order may be user configurable or may be defined by the system architect. In another embodiment, rendering parameter adjustment component 326 may adjust the rendering parameters in a random, pseudo-random or deterministic order.

In one embodiment, rendering parameter adjustment component 326 can adjust the rendering parameters to provide the reader with assistance, for example, in finding the next such written element, particularly when the reading progresses from one line or column to the next, or by providing the definition or pronunciation of these written elements. Factors including the time of day, brightness of the environment, or health, age and reading ability of the reader, can also be used to optimize the presentation. For example, rendering parameter adjustment component 326 can adjust the font to assist readers suffering from dyslexia. Adjustments that may be helpful to such readers include altering characters that are mirror images of one another, such as "b" and "d" to have more pronounced differences. Another adjustment could include having the stroke weight be heavier at the bottom of a line of text than at that top. Rendering parameter adjustment component 326 can dynamically adjust the degree of the rendering parameter values from page to page to determine what adjustments result in improved reading immersion.

In one embodiment, comparison component 328 is configured to compare reading performance feedback received when the electronic publication is displayed with different sets of rendering parameter values. For example, feedback component 324 may capture reading performance feedback for a first interval, when the electronic publication is presented with a first set of rendering parameter values and capture additional reading performance feedback for a second interval, when the electronic publication is presented with a second set of rendering parameter values. Feedback component 324 can provide the reading performance feedback to comparison component 328, which can compare the feedback to determine whether the reading performance feedback for the second interval reflected an improvement in reading immersion. Indications of improved reading immersion may include increased reading speeds, increased reading durations, decreased error rates, increased reading comprehension, etc. Since the second set of rendering parameter values includes an adjustment to at least one rendering parameter value, if comparison component 328 determines an improvement in reading immersion, that improvement can be attributed to the adjustment of the rendering parameter value. In one embodiment, prior to comparing the reading performance feedback, comparison component 328 may exclude certain feedback values from the comparison. For example, comparison component 328 may exclude the reading times or error rates for the first and last pages of a reading session or of an interval within a session, as those feedback values may be unreliable. In another embodiment, comparison component 328 may exclude any reading times that are less than a low threshold or greater than a high threshold, as it is likely that the reader is either just skimming through the pages or stopped reading for a period of time. Similarly, the eye movement tracking system may be used to determine if the reader is actually viewing a given page, and if not, comparison component 328 can exclude the feedback associated with that page.

In one embodiment, user profile component 330 manages user profile data 332-334. When comparison component 328 determines an improvement in reading immersion (e.g., if a second reading speed is greater than a first reading speed or if a second error rate is lower than a first error rate), user profile component 330 may update user profile data 332-334 to indicate that the second set of rendering parameter values is preferred for future display of the electronic publication. When user profile data 332-334 is updated, the updated set of rendering parameter values may become the new default set of rendering parameter values that are initially provided by presentation component 322 at the start of a new reading session. In one embodiment, user profile component 330 updates user profile data 332-334 every time an improvement is determined. In another embodiment, user profile component 330 updates user profile data 332-334 only when an optimized value for a certain parameter is determined. In yet another embodiment, user profile component 330 updates user profile data 332-334 only when a complete optimized set of rendering parameter values is determined.

In one embodiment, user profile data 332-334 may have multiple sets of optimized rendering parameter values. For example, there may be different sets of parameters for different categories of content, such as one set of optimized parameters for reading a newspaper and another set of optimized parameters for reading a fiction novel. There may also be different sets of parameters for different devices. If the user profile data 332-334 is available for the user across multiple different devices, there may be one set of optimized parameters for an electronic reader with an electronic ink display and another set of optimized parameters for a smartphone with a liquid crystal display (LCD). In another embodiment, there may be different sets of parameters for different times of day, different ambient light levels, different geographic locations, different languages, etc. In one embodiment, user profile data 332 and user profile data 334 may be associated with different users of the same user device. In one embodiment, the optimized parameters in user provide data 332-334 may be made available to other applications 210 besides the application from which the reading performance feedback was gathered. For example, if the optimized parameters are determined from the users reading behavior in an electronic reading application, those same parameters may be shared with a web browser, an email application, a messaging application, a word processing application, or any other application on user device 200.

Figure 4:
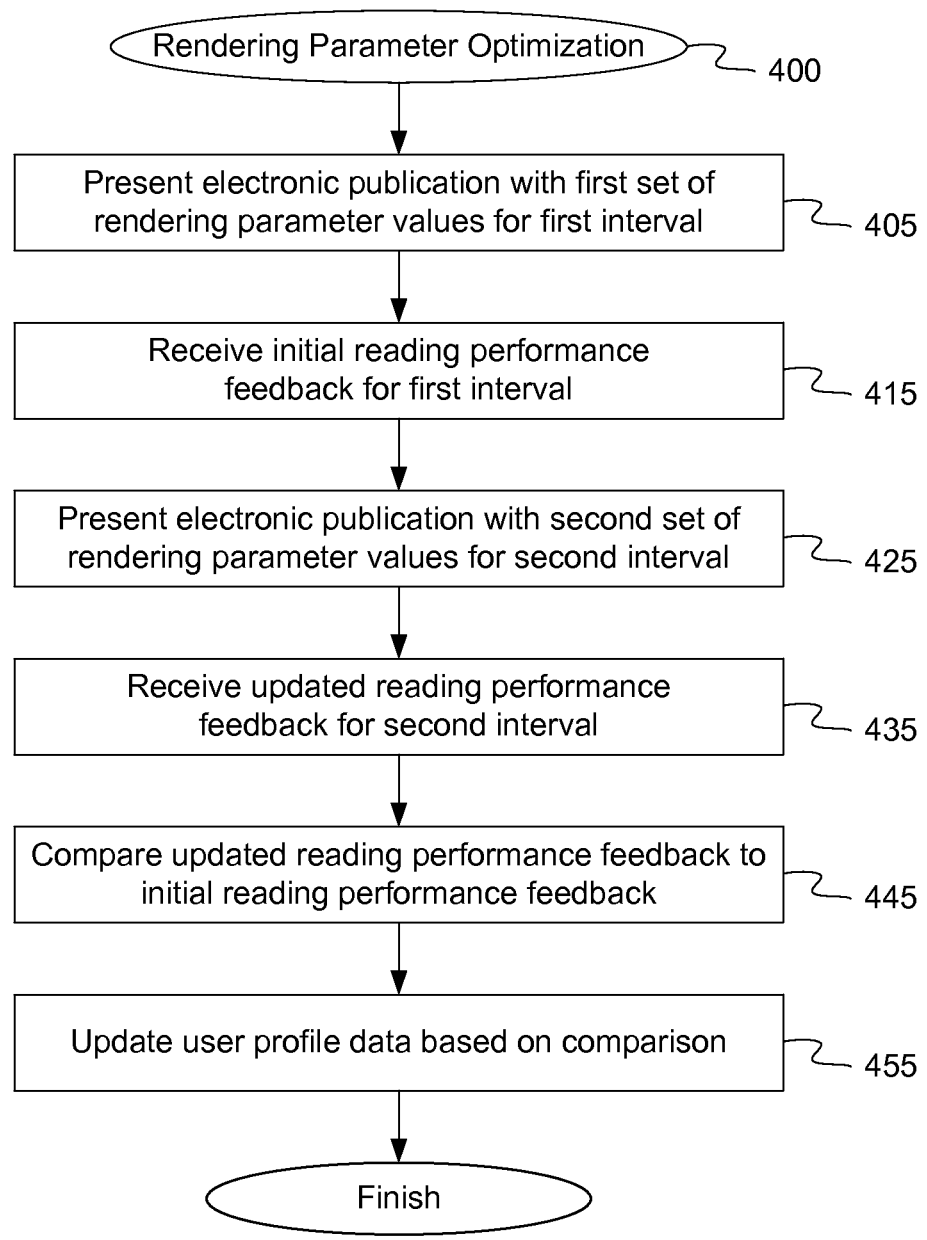
FIG. 4 is a flow diagram illustrating a rendering parameter optimization method, according to an embodiment.

FIG. 4 is a flow diagram illustrating a rendering parameter optimization method, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to adjust one or more device configuration settings to control the presentation of an electronic publication and subtly adjust the rendering parameter values from page to page while capturing reading performance feedback. In one embodiment, method 400 may be performed by rendering optimizer 220, as shown in FIGS. 2 and 3.

Referring to FIG. 4, at block 405, method 400 presents an electronic publication with a first set of rendering parameter values for a first interval. In one embodiment, presentation component 322 provides the first set of rendering parameter values to the application 210 to cause the application 210 to present the electronic publication on a display of user device 200 according to the first set of rendering parameter values. In one embodiment, presentation component 322 may provide values for various rendering parameters including at least font size, margin size, line length and character spacing.

At block 415, method 400 receives initial reading performance feedback for the first interval. In one embodiment, feedback component 324 receives reading performance feedback from application 210 during the first interval. Depending on the embodiment, feedback component 324 may capture a reading speed or an error rate for the first interval. In one embodiment, feedback component 324 may store the received reading performance feedback in corresponding user profile data 332-334.

At block 425, method 400 presents the electronic publication with a second set of rendering parameter values for a second interval. In one embodiment, the second set of rendering parameter values includes at least one rendering parameter value of the first set of rendering parameter values adjusted by a step amount. In one embodiment, rendering parameter adjustment component 326 may adjust one or more of the initial set of rendering parameter values to create the second set of rendering parameter values. Upon creation, presentation component 322 may provide the second set of rendering parameter values to application 210 to cause the application 210 to present the electronic publication according to the second set of rendering parameter values. In one embodiment, the rendering parameter values are adjusted based on observed data from other users. For example, the reading behavior of a population of users may be examined to determine the most popular rendering parameter values. These rendering parameter values may be used as the second set of rendering parameter values to test their impact for the current user. In one embodiment, the rendering parameter values collected from other users are only a starting point and can be further refined for the current user through an iterative testing process. In one embodiment, the rendering parameter values collected from other users are categorized using contextual information such as demographics of the user, content category, location, etc.

At block 435, method 400 receives updated reading performance feedback for the second interval. In one embodiment, feedback component 324 receives reading performance feedback from application 210 during the second interval. In one embodiment, the feedback may be in the same form (e.g., reading speed or error rate) as was captured during the first interval. In one embodiment, feedback component 324 may store the received reading performance feedback in corresponding user profile data 332-334 or provide the reading performance feedback directly to comparison component 328.

At block 445, method 400 compares the initial reading performance feedback to the updated reading performance feedback. In one embodiment, comparison component 328 compares the reading performance feedback received when the electronic publication is displayed with different sets of rendering parameter values to determine whether the reading performance feedback for the second interval reflected an improvement in reading immersion. An indication of improved reading immersion may include an increased reading speed or decreased error rate.

At block 455, method 400 updates user profile data based on the comparison to indicate that the second set of rendering parameter values is preferred for future display of the electronic publication. In one embodiment, when comparison component 328 determines an improvement in reading immersion (e.g., if a second reading speed is greater than a first reading speed or if a second error rate is lower than a first error rate), user profile component 330 may update user profile data 332-334. Thus, the second set of rendering parameter values will be used for future display of the electronic publication.

Figure 5:
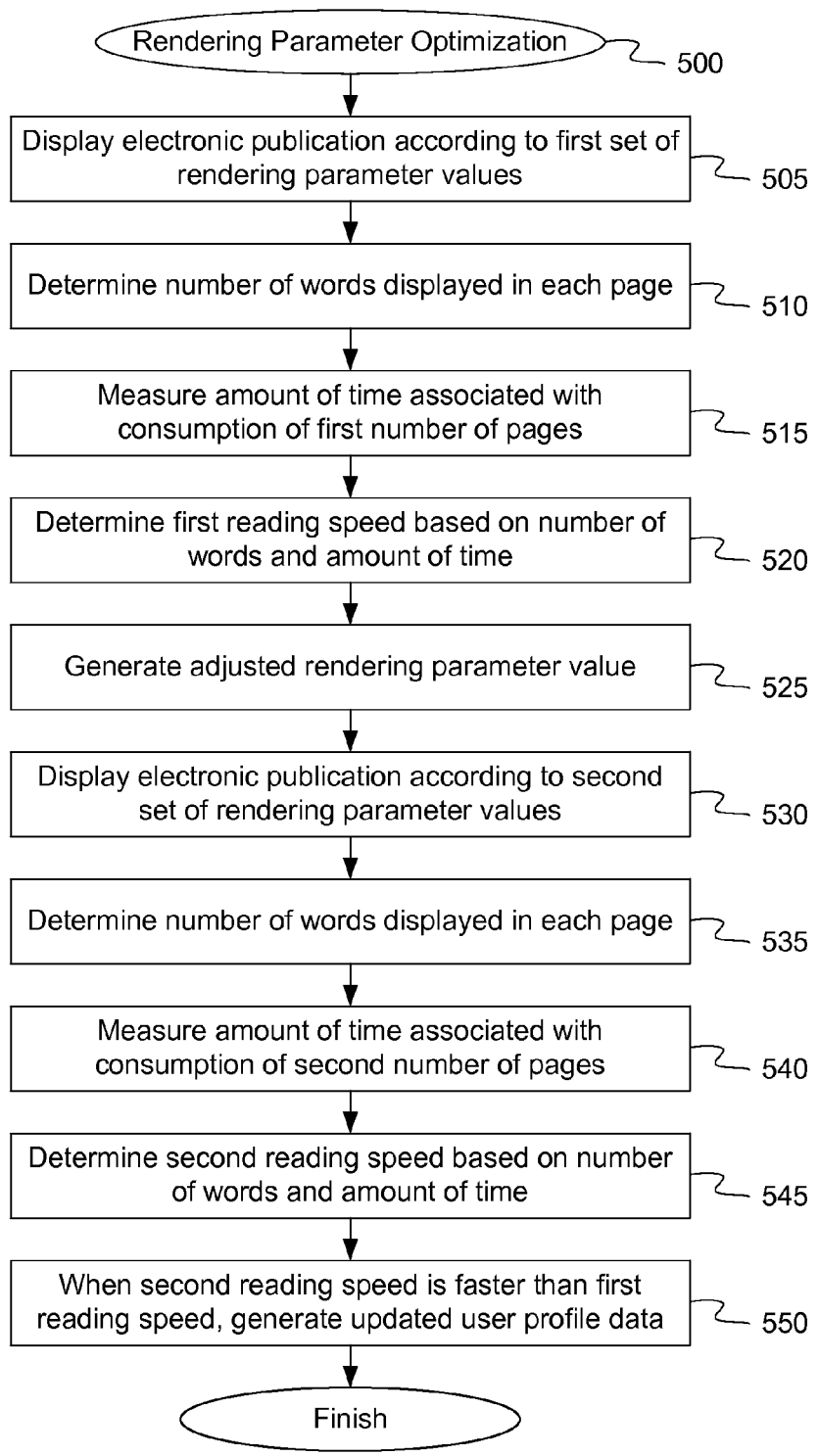
FIG. 5 is a flow diagram illustrating a rendering parameter optimization method, according to an embodiment.

FIG. 5 is a flow diagram illustrating a rendering parameter optimization method, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to adjust one or more device configuration settings to control the presentation of an electronic publication and subtly adjust the rendering parameter values from page to page while capturing reading performance feedback. In one embodiment, method 500 may be performed by rendering optimizer 220, as shown in FIGS. 2 and 3.

Referring to FIG. 5, at block 505, method 500 displays a first plurality of pages of an electronic publication according to a first set of rendering parameter values. In one embodiment, presentation component 322 provides the first set of rendering parameter values to the application 210 to cause the application 210 to present the electronic publication on a display of user device 200 according to the first set of rendering parameter values.

At block 510, method 500 determines a first number of words displayed in each page in view of the first set of rendering parameters. In one embodiment, feedback component 324 queries application 210 for the number of words that are displayed on a current page given the current set of rendering parameters.

At block 515, method 500 measures a first amount of time associated with consumption of the first plurality of pages. In one embodiment, feedback component 324 uses a timer to determine how long the user spends reading each page. For example, feedback component 324 may start the timer when the page is first rendered and stop the timer when a "turn page" command is received. In another embodiment, feedback component 324 may measure the period of time between received "turn page" commands.

At block 520, method 500 determines a first reading speed for the first plurality of pages based on the first number of words displayed and the first amount of time. In one embodiment, feedback component 324 divides the number of words by the value of the timer to determine the user's reading speed (e.g., to calculate words per minute, or some other measure of speed).

At block 525, method 500 generates at least one adjusted rendering parameter value of the first set of rendering parameter values by changing the previous value by a step amount to create a second set of rendering parameter values. In one embodiment, rendering parameter adjustment component 326 may adjust the rendering parameter value by an amount not larger than a threshold amount relative to the previous value to create the second set of rendering parameter values.

At block 530, method 500 displays a second plurality of pages of the electronic publication according to a second set of rendering parameter values. In one embodiment, presentation component 322 provides the second set of rendering parameter values to the application 210 to cause the application 210 to present the electronic publication on the display of user device 200 according to the second set of rendering parameter values.

At block 535, method 500 determines a second number of words displayed in each page in view of the second set of rendering parameters. In one embodiment, feedback component 324 queries application 210 for the number of words that are displayed on a current page given the current set of rendering parameters.

At block 540, method 500 measures a second amount of time associated with consumption of the second plurality of pages. In one embodiment, feedback component 324 uses a timer to determine how long the user spends reading each page. For example, feedback component 324 may start the timer when the page is first rendered and stop the timer when a "turn page" command is received. In another embodiment, feedback component 324 may measure the period of time between received "turn page" commands.

At block 545, method 500 determines a second reading speed for the second plurality of pages based on the second number of words displayed and the second amount of time. In one embodiment, feedback component 324 divides the number of words by the value of the timer to determine the user's reading speed (e.g., to calculate words per minute, or some other measure of speed).

When the second reading speed is greater than the first reading speed, at block 550, method 500 generates updated user profile data to indicate that the second set of rendering parameter values is preferred and is to be used for future display of the electronic publication. In one embodiment, comparison component 328 compares the reading performance feedback received when the electronic publication is displayed with different sets of rendering parameter values to determine whether the reading performance feedback for the second interval reflected an improvement in reading immersion. In one embodiment, when comparison component 328 determines an improvement in reading immersion (e.g., if the second reading speed is greater than the first reading speed or if a second error rate is lower than a first error rate), user profile component 330 may update user profile data 332-334.

Figure 6:
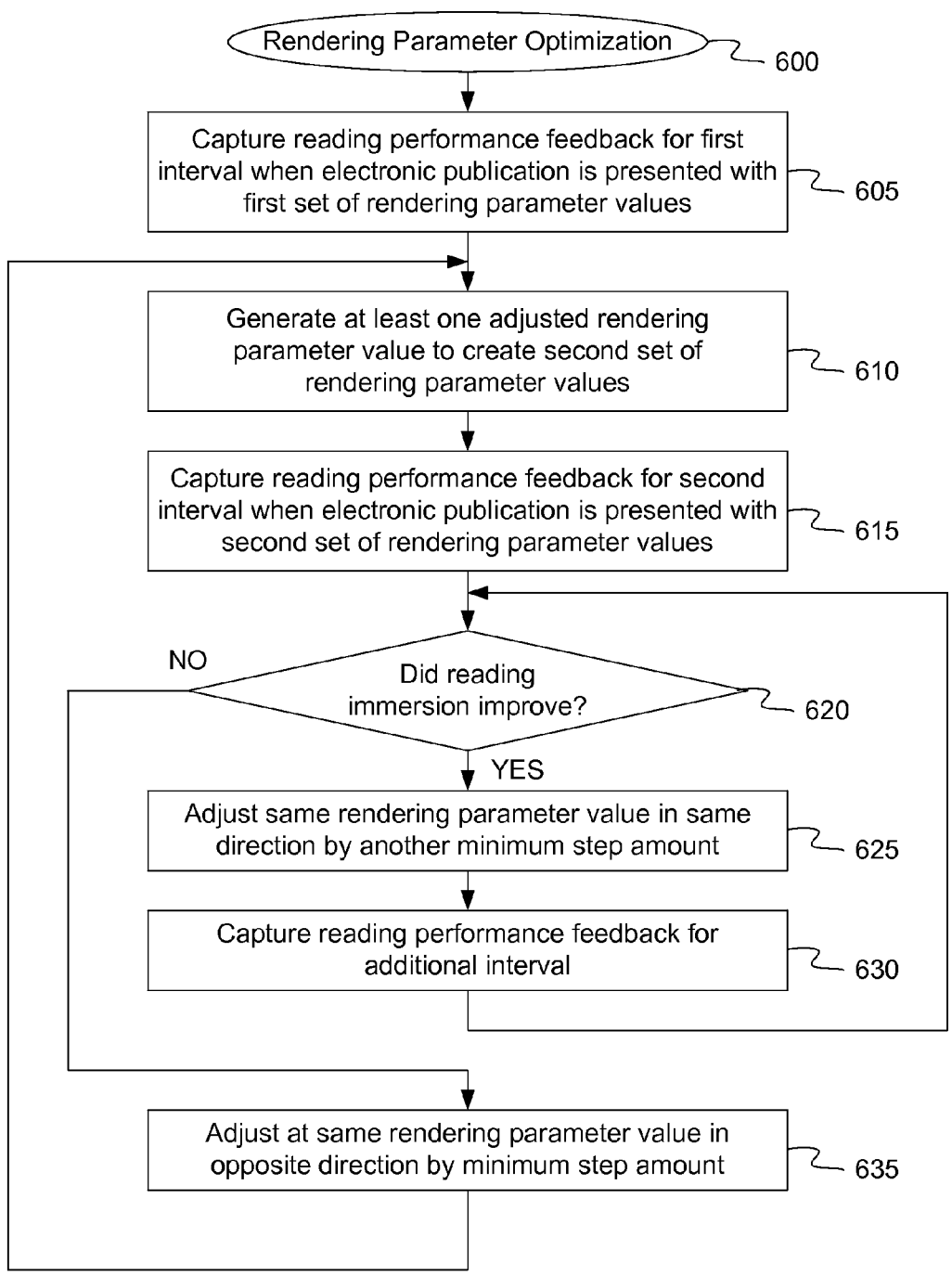
FIG. 6 is a flow diagram illustrating a rendering parameter optimization method, according to an embodiment.

FIG. 6 is a flow diagram illustrating a rendering parameter optimization method, according to an embodiment. The method 600 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to adjust one or more device configuration settings to control the presentation of an electronic publication and subtly adjust the rendering parameter values from page to page while capturing reading performance feedback. In one embodiment, method 600 may be performed by rendering optimizer 220, as shown in FIGS. 2 and 3.

Referring to FIG. 6, at block 605, method 600 captures reading performance feedback for a first interval when the electronic publication is presented with a first set of rendering parameter values. In one embodiment, feedback component 324 captures reading performance feedback from application 210 during the first interval. In one embodiment, feedback component 324 may store the received reading performance feedback in corresponding user profile data 332-334 or provide the reading performance feedback directly to comparison component 328.

At block 610, method 600 generates at least one adjusted rendering parameter value of the first set of rendering parameter values by changing a previous value by a step amount in a first direction to create a second set of rendering parameter values. In one embodiment, rendering parameter adjustment component 326 may adjust the rendering parameter value by an amount not larger than a threshold amount relative to the previous value to create the second set of rendering parameter values.

At block 615, method 600 captures reading performance feedback for a second interval when the electronic publication is presented with the second set of rendering parameter values. In one embodiment, feedback component 324 captures reading performance feedback from application 210 during the second interval. In one embodiment, the feedback may be in the same form (e.g., reading speed or error rate) as was captured during the first interval.

At block 620, method 600 determines whether the reading performance feedback for the second interval reflected an improvement in reading immersion. In one embodiment, comparison component 328 compares the reading performance feedback received when the electronic publication is displayed with different sets of rendering parameter values to determine whether the reading performance feedback for the second interval reflected an improvement in reading immersion. An indication of improved reading immersion may include an increased reading speed or decreased error rate.

If at block 620, method 600 determines an improvement in reading immersion, at block 625, method 600 generates another adjusted rendering parameter value by further changing the rendering parameter value by the step amount in the first direction, to create another set of rendering parameter values and, at block 630, method 600 captures reading performance feedback for another interval when the electronic publication is presented with the next set of rendering parameter values. For example if the font size was increase and an improvement was detected, at block 625, rendering parameter adjustment component 326 may further increase the font size. In one embodiment, rendering parameter adjustment component 326 may continue adjusting the rendering parameter value and feedback component 324 may continue capturing reading performance feedback for the new interval as long as the reading immersion continues to improve.

If at some point, method 600 determines that there is no further improvement in reading immersion, at block 635, method 600 adjusts the same rendering parameter value by the step amount in a second direction, opposite the first direction, to create another set of rendering parameter values. For example, if at first the font size was increased, but no improvement was detected, at block 635, rendering parameter adjustment component 326 may decrease the font size and feedback component 324 capture reading performance feedback for another interval to see if the reading immersion improves.

In one embodiment, method 600 returns to block 610 and repeats the operations at block 610-635 for each remaining parameter until a complete set of optimized rendering parameter values has been determined. Once all rendering parameter values have been tested, method 600 can continue iterating as recent adjustments to certain rendering parameter values may impact previously optimized rendering parameter values. As a result, a new combination may further improve reading immersion. In addition, the user's reading behavior may change over time, as they may become a more proficient reader, their eyesight may change, their visual preferences may change, etc. Thus, in one embodiment, method 600 continues operation indefinitely to further refine the optimal set of rendering parameter values.

Figure 7:
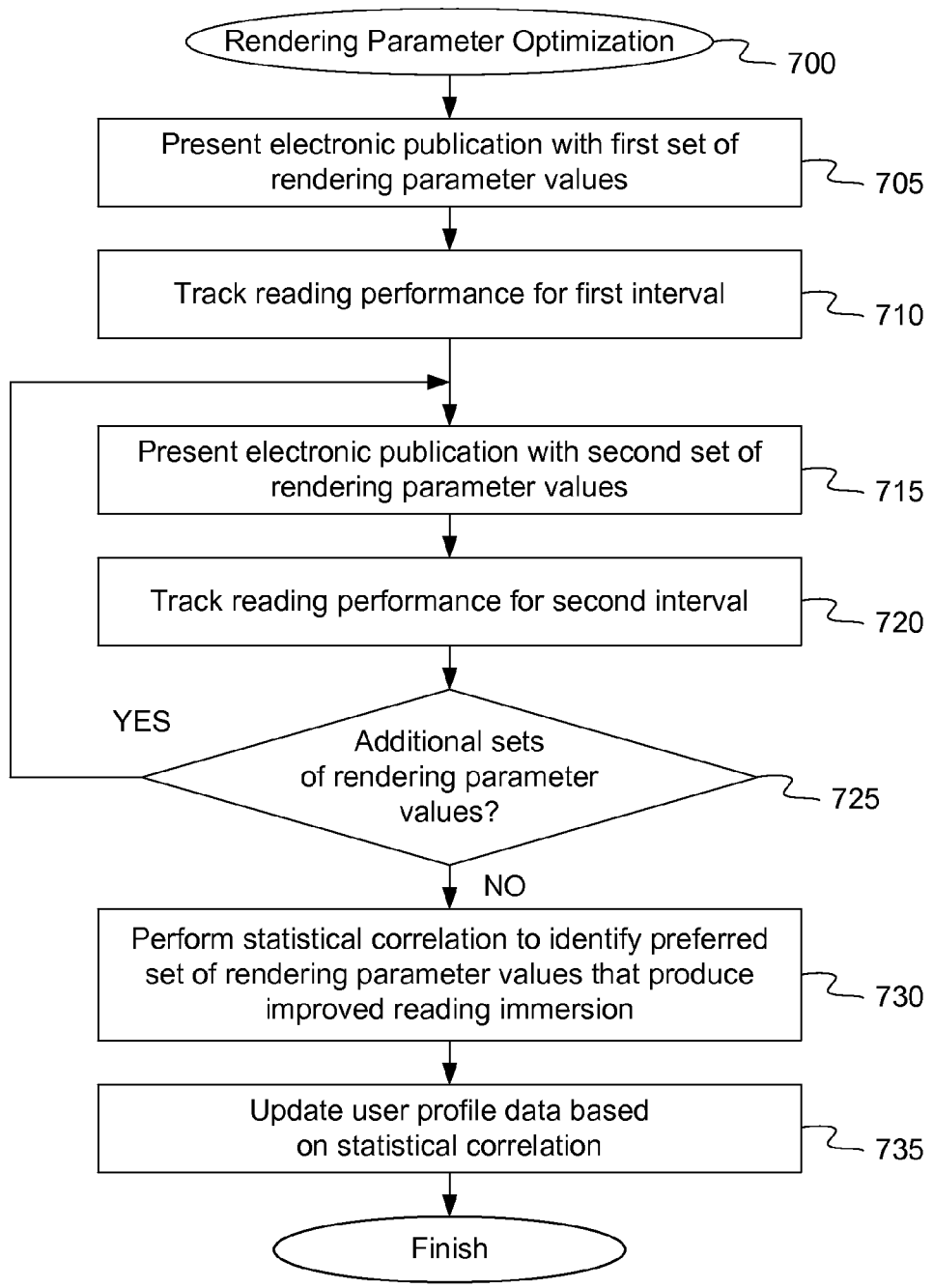
FIG. 7 is a flow diagram illustrating a rendering parameter optimization method, according to an embodiment.

FIG. 7 is a flow diagram illustrating a rendering parameter optimization method, according to an embodiment. The method 700 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to adjust one or more device configuration settings to control the presentation of an electronic publication and subtly adjust the rendering parameter values from page to page while capturing reading performance feedback. In one embodiment, method 700 may be performed by rendering optimizer 220, as shown in FIGS. 2 and 3.

Referring to FIG. 7, at block 705, method 700 presents the electronic publication with a first set of rendering parameter values. In one embodiment, presentation component 322 provides the first set of rendering parameter values to the application 210 to cause the application 210 to present the electronic publication on a display of user device 200 according to the first set of rendering parameter values.

At block 710, method 700 tracks reading performance for a first interval. In one embodiment, feedback component 324 receives reading performance feedback from application 210 during the first interval. Depending on the embodiment, feedback component 324 may capture a reading speed or an error rate for the first interval. In one embodiment, feedback component 324 may store the received reading performance feedback in corresponding user profile data 332-334.

At block 715, method 700 presents the electronic publication with a second set of rendering parameter values. In one embodiment, presentation component 322 provides the second set of rendering parameter values to the application 210 to cause the application 210 to present the electronic publication on a display of user device 200 according to the second set of rendering parameter values.

At block 720, method 700 tracks reading performance for a second interval. In one embodiment, feedback component 324 receives reading performance feedback from application 210 during the second interval. In one embodiment, the feedback may be in the same form (e.g., reading speed or error rate) as was captured during the first interval. In one embodiment, feedback component 324 may store the received reading performance feedback in corresponding user profile data 332-334 or provide the reading performance feedback directly to comparison component 328.

At block 725, method 700 determines whether there are additional sets of rendering parameter values to be tested. If so, method 700 returns to block 715 and repeats the operations of blocks 715 and 720 for each remaining set of rendering parameter values.

If no additional sets of rendering parameter values remain, at block 730, method 700 performs a statistical correlation to identify a preferred set of rendering parameter values that produce an improvement in reading immersion. In one embodiment the statistical correlation identifies statistical relationships involving dependence between certain rendering parameter values and resulting reading performance feedback.

At block 735, method 700 updates user profile data based on the statistical correlation to indicate that a certain set of rendering parameter values is preferred for future display of the electronic publication. In one embodiment, user profile component 330 may update user profile data 332-334. Thus, the new set of rendering parameter values will be used for future display of the electronic publication. In one embodiment, rendering parameter optimizer 220 may continue execution of method 700 indefinitely to constantly refine and improve the optimized set of rendering parameter values. In another embodiment, once a reader's immersion, reading speed or error rate places them in a certain percentile of all readers or if their reading has improved by a certain amount since tracking began, rendering parameter optimizer 220 may determine that the current set of optimized rendering parameter values are sufficient and cease execution of method 700.

Figure 8:
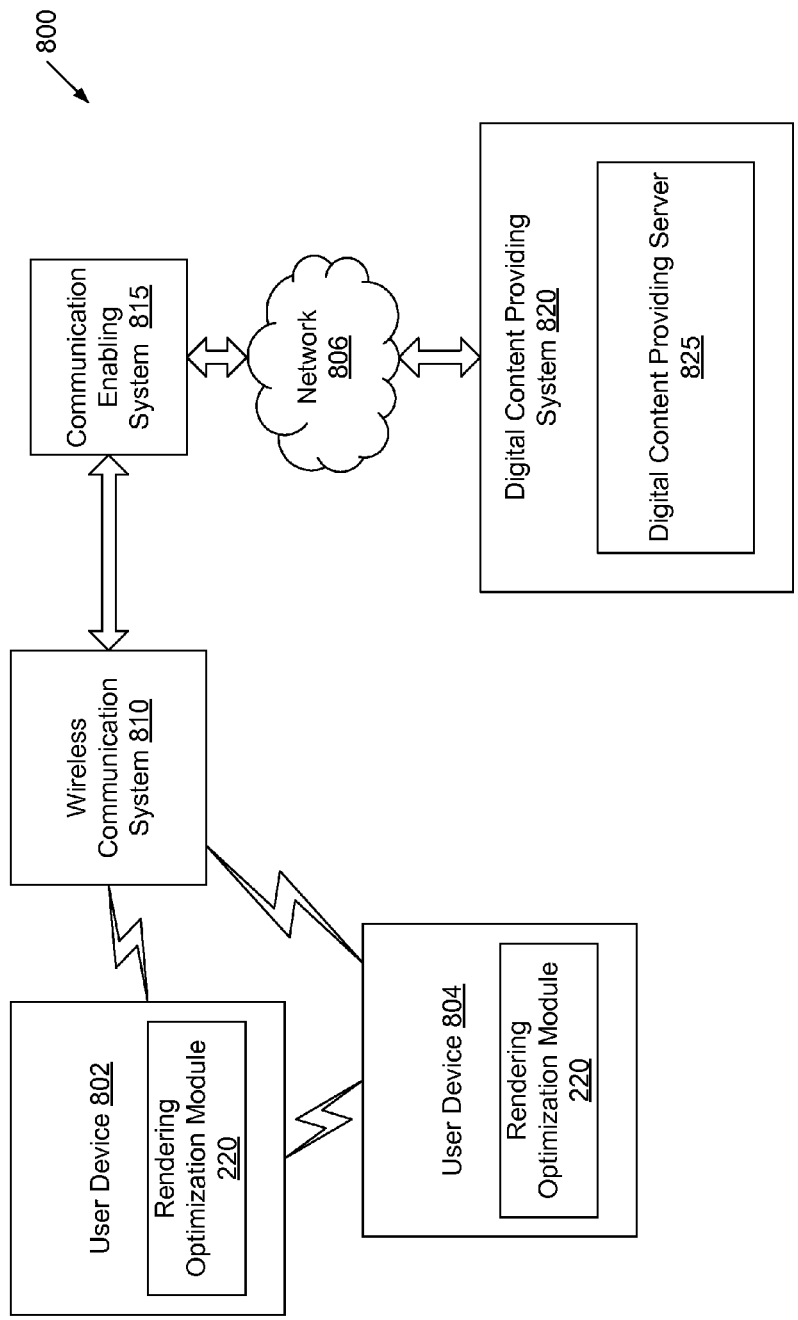
FIG. 8 is a block diagram of a network architecture, in which embodiments of the present invention may operate.

FIG. 8 is a block diagram of a network architecture 800, in which embodiments of the present invention described herein may operate. The network architecture 800 may include a digital content providing system 820 and one or more user devices 802, 804 capable of communicating with the digital content providing system 820 via a network 806. Network 806 may include, for example, a public network such as the Internet or a private network such as a local area network (LAN).

The user devices 802, 804 may be portable computing devices such as electronic book readers or tablet computers (e.g., that include a book reader application). Other examples of portable computing devices include cellular telephones, personal digital assistants (PDAs), portable media players, netbooks, and the like. The user devices 802, 804 may also be non-portable computing devices such as a desktop computer, a set-top box associated with a television, a gaming console, and so on. The user devices 802, 804 are variously configured with different features to enable consumption of one or more types of digital content and electronic publications. The digital content and electronic publications may include electronic books (ebooks) such as electronic textbooks and/or other electronic publications (electronic versions of publications) such as electronic magazines, digital newspapers, digital audio books, electronic journals, real simple syndication (RSS) feeds, etc. The publications may also include digital video (e.g., movies, television, short clips, etc.), images (e.g., art, photographs, etc.), and multi-media content.

The digital content providing system 820 may correspond to any feature or combination of features for providing electronic publications or other digital content to the user devices 802, 804. The digital content providing system 820 may include a network-accessible server-based functionality (digital content providing server 825), various data stores (not shown), and/or other data processing equipment. The digital content providing system 820 may be implemented by a single machine or a cluster of machines. The digital content providing system 820 may include one or more machines (e.g., one or more server computer systems, routers, gateways, etc.) that have processing and storage capabilities to provide the server-based functionality.

In one embodiment, the digital content providing server 825 corresponds to an entity which provides electronic publications (e.g., electronic books) to users upon the users' purchase or download of the items. In this role, the digital content providing server 825 may essentially act as a bookseller or the like. In other cases, the digital content providing server 825 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 825 may deliver, and the user devices 802, 804 receive, electronic publications (or other media items), search results, upgrades, and/or other information via the network 806. For example, the user devices 802, 804 may download or receive ebooks from the digital content providing server 825. The digital content providing server 825 may also receive various requests (e.g., search queries), instructions and other data from the user devices 802, 804 via the network 806.

Communication between the user devices 802, 804 and the item providing system 820 may be enabled via any communication infrastructure. One example of such an infrastructure includes a combination of a wide area network (WAN) and wireless infrastructure, which allows a user to use the user devices 802, 804 to purchase digital content (e.g., electronic publications) and consume the digital content without being tethered to the digital content providing system 820 via hardwired links. The wireless infrastructure may be provided by one or multiple wireless communications systems, such as wireless communication system 810. In one embodiment, wireless communication system 810 may be a wireless fidelity (WLAN) hotspot connected with the network 806. Wireless communication system 810 may also be a wireless carrier system that can be implemented using various data processing equipment, communication towers, etc. Alternatively, or in addition, the wireless carrier system may rely on satellite technology to exchange information with the user devices 802, 804.

The communication infrastructure may also include a communication-enabling system 815 that serves as an intermediary in passing information between the digital content providing system 820 and the wireless communication system 810. The communication-enabling system 815 may communicate with the wireless communication system 810 (e.g., a wireless carrier) via a dedicated channel, and may communicate with the digital content providing system 820 via a non-dedicated communication mechanism, (e.g., a public Wide Area Network (WAN) such as the Internet).

In addition to wirelessly connecting to wireless communication system 810, user devices 802, 804 may also wirelessly connect to other user devices 802, 804. For example, user device 802 may form a wireless ad hoc (peer-to-peer) network with user device 804 using WiFi™, Bluetooth, or other wireless communication protocols.

In one embodiment, each of user devices 802, 804 include rendering optimizer 220. As described above, rendering optimizer 220 may be configured to perform dynamic adjustment of rendering parameters to optimize reading speed. Additional details of rendering optimizer 220 are provided above.

Figure 9:
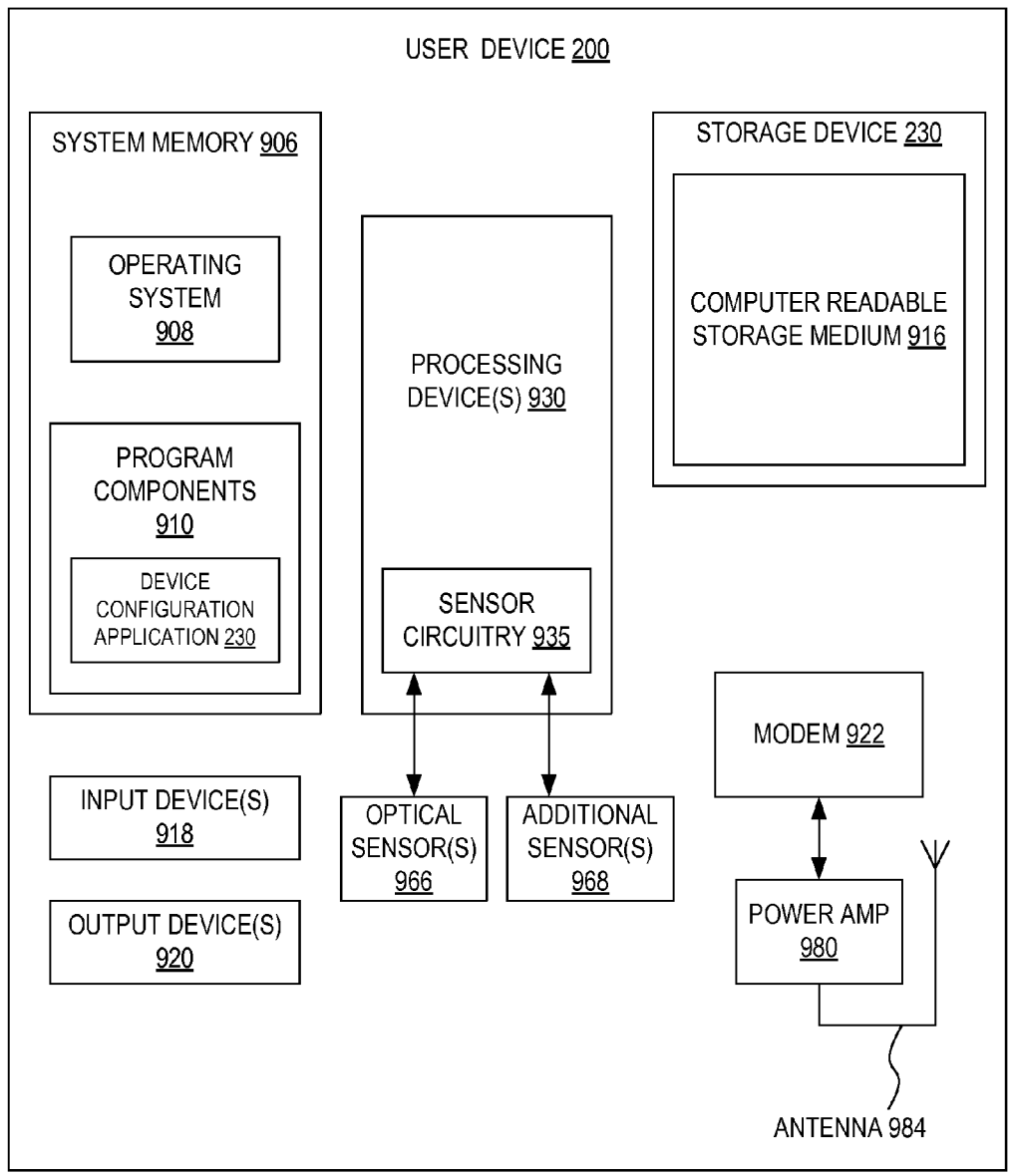
FIG. 9 is a block diagram illustrating a user device, according to an embodiment.

FIG. 9 is a block diagram illustrating a user device 200, according to an embodiment of the present invention. In one embodiment, the user device 200 may correspond to one or all of the user devices 200 of FIG. 2 or 802, 804 of FIG. 8 and may be any type of user device such as an electronic book reader, a PDA, a mobile phone, a laptop computer, a portable media player, a tablet computer, an electronic pad, a desktop computer, a camera, a video camera, a netbook, and the like.

The user device 200 includes one or more processing devices 930, such as one or more CPUs, microcontrollers, field programmable gate arrays, or other types of processing devices. The user device 200 also includes system memory 906, which may correspond to any combination of volatile and/or non-volatile storage mechanisms. The system memory 906 stores information which provides an operating system component 908, various program components 910 corresponding to applications 210 and rendering optimizer 220, and/or other components. The user device 200 performs functions by using the processing device(s) 930 to execute instructions provided by the system memory 906.

The user device 200 also includes a data storage device 240 that may be composed of one or more types of removable storage and/or one or more types of non-removable storage. The data storage device 230 includes a computer-readable storage medium 916 on which is stored one or more sets of instructions embodying any one or more of the methodologies or functions described herein. As shown, the instructions may reside, completely or at least partially, within the computer readable storage medium 916, system memory 906 and/or within the processing device(s) 930 during execution thereof by the user device 200, the system memory 906 and the processing device(s) 930 also constituting computer-readable media. The user device 200 may also include one or more input devices 918 (keyboard, mouse device, specialized selection keys, etc.) and one or more output devices 920 (displays, printers, audio output mechanisms, etc.).

The user device 200 further includes a wireless modem 922 to allow the user device 200 to communicate via a wireless network (e.g., such as provided by the wireless communication system) and/or with other computing devices, such as remote computers, the item providing system, online book stores, electronic catalogs for libraries, and so forth. The wireless modem 922 may allow the user device 200 to handle both voice and non-voice communications (such as communications for text messages, multimedia messages, media downloads, web browsing, etc.) with the wireless communication system 810. The wireless modem 922 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi™, etc. The wireless modem 922 may generate signals and send these signals to power amplifier (amp) 980 for amplification, after which they are wirelessly transmitted via antenna 984. In addition to sending data, antenna 984 also receives data, which is sent to wireless modem 922 and transferred to processing device(s) 930.

In one embodiment, user device 200 includes an optical sensor 966. The optical sensor 966 may be a low resolution camera (e.g., having 0.2 or 0.3 Megapixels) that takes images (e.g., of a user's eyes) on a periodic basis. Alternatively, the optical sensor 966 may have a higher resolution, such as 1 Megapixel up to 10 or more Megapixels. The optical sensor 966 may be positioned such that images are taken of a user's face while the user holds the user device 200 in front of his face in a standard reading position.

Therefore, the optical sensor 966 may be used to track user eye movement during reading.

In one embodiment, user device 200 includes one or more additional sensors 968 such as a physical contact sensor, close proximity sensors, or motion sensors. The sensors 968 can detect the presence of human body parts, and convey information regarding the detected presence to processing device(s) 930. In one embodiment, the sensors 968 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 968 may also be optical (e.g., infrared) sensors that use an emitter and receiver pair to detect the presence of opaque objects. Alternatively, the sensors 968 may be inductive sensors, which include an inductive loop. When the presence of a human body part (or metal object) is brought close to the inductive sensor, an induction of the inductive loop changes, causing the human body part to be detected. Alternatively, the sensors 968 may be ultrasonic sensors that emit an ultrasonic signal and measure a time duration between when a signal is transmitted and the reflection of that signal received (a.k.a., flight response). The sensors 968 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 968 include a motion sensor, such as an accelerometer or one or more gyroscopes. The user device 200 may use motion data from motion sensors to determine whether a user is holding the user device 200. For example, if the user device 200 experiences constant minor accelerations, it may be determined that the user device 200 is being held in a user's hand. Additionally, if the user device 200 is at a particular angle (detectable based on acceleration readings from an accelerometer), it may be determined that the user device 200 is being rested on a user's leg during reading.

The processing device(s) 930 may include sensor circuitry 935 (e.g., sensor device drivers) that enables the processing device(s) 930 to interpret signals received from the optical sensor(s) 966 and/or additional sensors 968. In one embodiment, the optical sensors 966 and/or additional sensors 968 output raw sensor data. In another embodiment, the optical sensors 966 and/or additional sensors 968 output fully processed signals to the processing device(s) 930. For example, the additional sensors 968 may output a user contact/no user contact signal using a single line interface or a multi-line interface. In another embodiment, the additional sensors 968 output, for example, positional data and/or object presence data (e.g., of a human body part) to the processing devices 930 without first processing the data. In either instance, the processing devices 930 may use the sensor circuitry 935 to process and/or interpret the received data. If data is received from multiple sensors, processing the data may include averaging the data, identifying a maximum from the data, or otherwise combining the data from the multiple sensors.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
displaying, on a user device, a first plurality of pages of an electronic publication according to a first set of rendering parameter values;
determining a first number of words displayed as a first page of the first plurality of pages using the first set of rendering parameters;
determining a second number of words displayed as a second page of the first plurality of pages using the first set of rendering parameters;
measuring a first amount of time associated with consumption of the first and second pages;
determining a first reading speed for the first plurality of pages by dividing a sum of the first number of words and the second number of words by the first amount of time;
determining at least one rendering parameter value of the first set of rendering parameter values to adjust according to a statistical model trained via user accrued information and feedback from other users on the electronic publication;
generating, by a processing device of the user device, at least one adjusted rendering parameter value by increasing the at least one rendering parameter value by a step amount to create a second set of rendering parameter values comprising the increased rendering parameter value and a remainder of the first set of rendering parameter values;
displaying, on the user device, a second plurality of pages of the electronic publication according to the second set of rendering parameter values;
determining a third number of words displayed as a third page of the second plurality of pages using the second set of rendering parameters;
determining a fourth number of words displayed as a fourth page of the second plurality of pages using the second set of rendering parameters;
measuring a second amount of time associated with consumption of the third and fourth pages;
determining a second reading speed for the second plurality of pages by dividing a sum of the third number of words and the fourth number of words by the second amount of time;
determining that the second reading speed is greater than the first reading speed;
and
generating updated user profile data to indicate that the second set of rendering parameter values is to be used for future display of the electronic publication.

2. The method of claim 1, further comprising:
determining that a second electronic publication is being presented on the user device, the second electronic publication having a different content type than the first electronic publication;
capturing reading performance feedback associated with consumption of the second electronic publication; and
generating additional user profile data to indicate a third set of rendering parameter values associated with the different content type.

3. The method of claim 1, further comprising:
generating a second adjusted rendering parameter value by increasing a margin size for display of the electronic publication by a step amount to create a third set of rendering parameter values comprising the increased margin size and a remainder of the second set of rendering parameter values; and
displaying, on the user device, a third plurality of pages of the electronic publication according to the third set of rendering parameter values.

4. A user device comprising:
a memory to store rendering optimization data; and
a processing device, operatively coupled to the memory, the processing device to:
cause presentation of first electronic content based at least in part on a first set of rendering parameter values for a first interval;
receive initial content engagement feedback associated with the first interval;
determine at least one rendering parameter value of the first set of rendering parameter values to adjust according to a statistical model trained via user accrued information and feedback from other users on the electronic publication;
cause presentation of the first electronic content based at least in part on a second set of rendering parameter values for a second interval, the second set of rendering parameter values comprising the at least one rendering parameter value of the first set of rendering parameter values adjusted by a step amount;
receive updated content engagement feedback associated with the second interval;
compare the updated content engagement feedback to the initial content engagement feedback;
and
generate updated user profile data to indicate that the second set of rendering parameter values is to be used for future display of the first electronic content.

5. The user device of claim 4, wherein the processing device is further configured to:
determine that the updated content engagement feedback reflects an improvement in reading immersion with respect to the initial content engagement feedback; and
cause presentation of the first electronic content based at least in part on a third set of rendering parameter values for a third interval, the third set of rendering parameter values comprising the at least one rendering parameter value of the first set of rendering parameter values further adjusted by the step amount.

6. The user device of claim 4, wherein the processing device is further configured to:
determine that the updated content engagement feedback reflects an decline in reading immersion with respect to the initial content engagement feedback; and
cause presentation of the first electronic content based at least in part on a fourth set of rendering parameter values for a fourth interval, the fourth set of rendering parameter values comprising a different rendering parameter value of the first set of rendering parameter values adjusted by the step amount.

7. The user device of claim 4, wherein the processing device is further configured to:
perform a statistical correlation to identify a preferred set of rendering parameter values that produce an improvement in reading immersion, wherein the processing device determines the reading immersion using at least one of a user's reading speed, legibility, or reading duration.

8. The user device of claim 4, wherein the processing device is further configured to:

cause presentation of a second electronic content for a fifth interval, the second electronic content having a different content type than the first electronic content;

receive updated content engagement feedback associated with the fifth interval; and determine a fifth set of rendering parameter values that causes an improvement in content engagement for the second electronic content.

9. The user device of claim 4, wherein the at least one rendering parameter value comprises at least one of illumination wavelength, font size, margin size, line length, hyphenation or character spacing.

10. The user device of claim 4, wherein the processing device measures the initial content engagement feedback and the updated content engagement feedback using at least one of reading speed or legibility.

11. The user device of claim 4, wherein the processing device measures the first interval and the second interval using at least one of a number of pages displayed or a period of time for which a user has been reading the first electronic content during a current session.

12. The user device of claim 4, wherein the step amount comprises an amount not larger than a threshold amount relative to a previous value of the at least one rendering parameter.

13. A method comprising:

capturing first content engagement feedback associated with a first interval, wherein electronic content is presented with a first set of rendering parameter values during the first interval;

determining a value of the first set of rendering parameter values to adjust according to a statistical model trained via user accrued information and feedback from other users on the electronic publication;

generating, by a processing device, at least one adjusted rendering parameter value by modifying the value of the first set of rendering parameter values by a step amount in a first direction to create a second set of rendering parameter values;

capturing second content engagement feedback associated with a second interval, wherein the electronic content is presented with the second set of rendering parameter values during the second interval;

determining that the second set of rendering parameter values resulted in an improvement in reading immersion reflected in the second content engagement feedback; and generating a second adjusted rendering parameter value by further modifying the at least one adjusted rendering parameter value by the step amount in the first direction to determine whether an additional improvement in reading immersion is reflected; and generating updated user profile data to indicate whether the second set of rendering parameter values is to be used for future display of the electronic content.

14. The method of claim 13, further comprising:

determining that an additional improvement in reading immersion is not reflected;

generating a third adjusted rendering parameter value by modifying the at least one adjusted rendering parameter value by the step amount in a second direction, opposite the first direction, to create a third set of rendering parameter values; and capturing third content engagement feedback associated with a third interval, wherein the electronic content is presented with the third set of rendering parameter values during the third interval.

15. The method of claim 13, further comprising:

determining that an additional improvement in reading immersion is not reflected;

generating a fourth adjusted rendering parameter value by modifying a different rendering parameter value of the first set of rendering parameter values by the step amount in the first direction, to create a fourth set of rendering parameter values; and capturing fourth content engagement feedback associated with a fourth interval, wherein the electronic content is presented with the fourth set of rendering parameter values during the fourth interval.

16. The method of claim 13, further comprising:

measuring the reading immersion using at least one of a user's reading speed, legibility or reading duration.

17. The method of claim 13, wherein modifying the value of the first set of rendering parameter values comprises modifying at least one of font size, margin size, line length, hyphenation or character spacing.

18. The method of claim 13, wherein capturing the first content engagement feedback and the second content engagement feedback comprises measuring at least one of reading speed or legibility.

19. The method of claim 13, wherein capturing the first content engagement feedback associated with the first interval comprises capturing the content engagement feedback for at least one of a number of pages displayed or a period of time for which a user has been reading the electronic content during a current session.

20. The method of claim 13, wherein modifying the value of the first set of rendering parameter values by the step amount comprises modifying the value by an amount not larger than a threshold amount relative to a previous value.

\* \* \* \* \*